(12) United States Patent
Joshi

(10) Patent No.: US 7,061,925 B2
(45) Date of Patent: Jun. 13, 2006

(54) SYSTEM AND METHOD FOR DECREASING LATENCY IN LOCATING ROUTES BETWEEN NODES IN A WIRELESS COMMUNICATION NETWORK

(75) Inventor: Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 10/863,710

(22) Filed: Jun. 7, 2004

(65) Prior Publication Data

US 2004/0246975 A1 Dec. 9, 2004

Related U.S. Application Data

(60) Provisional application No. 60/476,236, filed on Jun. 6, 2003.

(51) Int. Cl.
H04L 12/28 (2006.01)

(52) U.S. Cl. .......................... 370/401; 709/238

(58) Field of Classification Search ................ 370/310, 370/328–338, 347, 351, 400, 401, 428; 709/230, 709/238–244; 455/403, 422, 445
See application file for complete search history.

(56) References Cited

U.S. PATENT DOCUMENTS

| | | | |
|---|---|---|---|
| 4,494,192 A | 1/1985 | Lew et al. | |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |
| 5,034,961 A | 7/1991 | Adams | |
| 5,068,916 A | 11/1991 | Harrison et al. | |
| 5,231,634 A | 7/1993 | Giles et al. | |
| 5,233,604 A | 8/1993 | Ahmadi et al. | |
| 5,241,542 A | 8/1993 | Natarajan et al. | |
| 5,317,566 A | 5/1994 | Joshi | |
| 5,392,450 A | 2/1995 | Nossen | |
| 5,412,654 A | 5/1995 | Perkins | |
| 5,424,747 A | 6/1995 | Chazelas | |
| 5,502,722 A | 3/1996 | Fulghum | |
| 5,517,491 A | 5/1996 | Nanni et al. | |
| 5,555,425 A | 9/1996 | Zeller et al. | |

(Continued)

FOREIGN PATENT DOCUMENTS

CA 2132180 3/1996

(Continued)

OTHER PUBLICATIONS

Perkins C. Ad-hoc on-demand distance vector routing. Mobile Computing systems, 1999. Proceedings. WMCSA'99, IEEE, pp. 90-100.*

(Continued)

*Primary Examiner*—Hassan Kizou
*Assistant Examiner*—Dmitry Levitan
(74) *Attorney, Agent, or Firm*—Randi L. Karpinia; Joseph J. Buczynski

(57) ABSTRACT

A system and method for controlling the dissemination of Routing packets, and decreasing the latency in finding routes between nodes. The system and method provides message exchanges between wireless devices to determine optimized communication routes with a minimum of overhead messages and buffered data. Exchanged messages are reduced to a specific series of exchanges indicating destination, destination node detection, and route, preferably using a series of IAP devices. Routes are discovered in an efficient manner and latency in finding routes between nodes is reduced, thereby reducing buffered information levels at individual devices.

4 Claims, 2 Drawing Sheets

An Example Network

U.S. PATENT DOCUMENTS

| | | |
|---|---|---|
| 5,555,540 A | 9/1996 | Radke |
| 5,572,528 A | 11/1996 | Shuen |
| 5,615,212 A | 3/1997 | Ruszczyk et al. |
| 5,618,045 A | 4/1997 | Kagan et al. |
| 5,621,732 A | 4/1997 | Osawa |
| 5,623,495 A | 4/1997 | Eng et al. |
| 5,627,976 A | 5/1997 | McFarland et al. |
| 5,631,897 A | 5/1997 | Pacheco et al. |
| 5,644,576 A | 7/1997 | Bauchot et al. |
| 5,652,751 A | 7/1997 | Sharony |
| 5,680,392 A | 10/1997 | Semaan |
| 5,684,794 A | 11/1997 | Lopez et al. |
| 5,687,194 A | 11/1997 | Paneth et al. |
| 5,696,903 A | 12/1997 | Mahany |
| 5,701,294 A | 12/1997 | Ward et al. |
| 5,706,428 A | 1/1998 | Boer et al. |
| 5,717,689 A * | 2/1998 | Ayanoglu ............... 370/349 |
| 5,745,483 A | 4/1998 | Nakagawa et al. |
| 5,774,876 A | 6/1998 | Wooley et al. |
| 5,781,540 A | 7/1998 | Malcolm et al. |
| 5,787,080 A | 7/1998 | Hulyalkar et al. |
| 5,794,154 A | 8/1998 | Bar-On et al. |
| 5,796,732 A | 8/1998 | Mazzola et al. |
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,844,905 A | 12/1998 | McKay et al. |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |
| 5,909,651 A | 6/1999 | Chander et al. |
| 5,936,953 A | 8/1999 | Simmons |
| 5,943,322 A | 8/1999 | Mayer et al. |
| 5,987,011 A | 11/1999 | Toh |
| 5,987,033 A | 11/1999 | Boer et al. |
| 5,991,279 A | 11/1999 | Haugli et al. |
| 6,028,853 A | 2/2000 | Haartsen |
| 6,029,217 A | 2/2000 | Arimilli et al. |
| 6,034,542 A | 3/2000 | Ridgeway |
| 6,044,062 A | 3/2000 | Brownrigg et al. |
| 6,047,330 A | 4/2000 | Stracke, Jr. |
| 6,052,594 A | 4/2000 | Chuang et al. |
| 6,052,752 A | 4/2000 | Kwon |
| 6,064,626 A | 5/2000 | Stevens |
| 6,067,291 A | 5/2000 | Kamerman et al. |
| 6,067,297 A | 5/2000 | Beach |
| 6,078,566 A | 6/2000 | Kikinis |
| 6,104,712 A | 8/2000 | Robert et al. |
| 6,108,738 A | 8/2000 | Chambers et al. |
| 6,115,580 A | 9/2000 | Chuprun et al. |
| 6,122,690 A | 9/2000 | Nannetti et al. |
| 6,130,881 A | 10/2000 | Stiller et al. |
| 6,132,306 A | 10/2000 | Trompower |
| 6,134,587 A * | 10/2000 | Okanoue ............... 709/222 |
| 6,147,975 A | 11/2000 | Bowman-Amuah |
| 6,163,699 A | 12/2000 | Naor et al. |
| 6,178,337 B1 | 1/2001 | Spartz et al. |
| 6,192,053 B1 | 2/2001 | Angelico et al. |
| 6,192,230 B1 | 2/2001 | Van Bokhorst et al. |
| 6,208,870 B1 | 3/2001 | Lorello et al. |
| 6,222,463 B1 | 4/2001 | Rai |
| 6,222,504 B1 | 4/2001 | Oby |
| 6,223,240 B1 | 4/2001 | Odenwald et al. |
| 6,240,294 B1 | 5/2001 | Hamilton et al. |
| 6,246,875 B1 | 6/2001 | Seazholtz et al. |
| 6,249,516 B1 | 6/2001 | Brownrigg et al. |
| 6,275,707 B1 | 8/2001 | Reed et al. |
| 6,285,892 B1 | 9/2001 | Hulyalkar |
| 6,304,556 B1 | 10/2001 | Haas |
| 6,307,843 B1 * | 10/2001 | Okanoue ............... 370/312 |
| 6,327,300 B1 | 12/2001 | Souissi et al. |
| 6,349,091 B1 * | 2/2002 | Li ............... 370/238 |
| 6,349,210 B1 | 2/2002 | Li |
| 6,359,872 B1 | 3/2002 | Mahany et al. |
| 6,366,568 B1 | 4/2002 | Bolgiano et al. |
| 6,405,049 B1 | 6/2002 | Herrod et al. |
| 6,718,394 B1 * | 4/2004 | Cain ............... 709/242 |
| 6,775,258 B1 * | 8/2004 | van Valkenburg et al. .. 370/338 |
| 6,850,511 B1 * | 2/2005 | Kats et al. ............... 370/338 |
| 2001/0053699 A1 | 12/2001 | McCrady et al. |
| 2002/0013856 A1 | 1/2002 | Garcia-Luna-Aceves |
| 2003/0018774 A1* | 1/2003 | Flinck et al. ............... 709/223 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong, et al., "Soft Handoffs in CDMA Mobile Systems," Dec. 1997, IEEE Personal Communications.

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardaka and Wendell Kishaba, "QoS Networking With Adaptive Link Control and Tactical Multi-Channel Software Radios".

* cited by examiner

An Example Network

SYSTEM AND METHOD FOR DECREASING LATENCY IN LOCATING ROUTES BETWEEN NODES IN A WIRELESS COMMUNICATION NETWORK

This application claims benefit under 35 U.S.C. § 119(e) from U.S. Provisional Patent Application Ser. No. 60/476,236, filed on Jun. 6, 2003, the entire content of which is incorporated herein by reference.

BACKGROUND OF THE INVENTION

1. Field of the Invention

The present invention relates to a system and method for improving the system performance of a wireless communication network by controlling the dissemination of Routing packets, and decreasing the latency in finding routes between nodes. Specifically, the present invention provides a system and method of message exchanges to determine optimized communication routes with a minimum of overhead messages and buffered data.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference.

As can be appreciated by one skilled in the art, since certain nodes of the ad-hoc network are mobile, it is necessary for the network to maintain connectivity with those nodes. Transmitted data packets typically "hop" from mobile device to mobile device, creating a transmission path, or route, until reaching a final destination. However, transmission paths between mobile devices are often subject to change as devices move, therefore ad-hoc network communication must be able to adapt to achieve optimum performance while addressing the limited capabilities and capacities of mobile individual devices.

Wireless networks frequently use On-Demand protocols (e.g. ad-hoc on demand distance vector (AODV), (RFC 3561), dynamic source routing (DSR) (Internet Draft), and so forth, as the routing protocol in such communications. This type of routing protocol creates routes only when desired by the source node. When a node requires a route to a destination, it initiates a route discovery process within the network. This process is completed once a route is found or all possible route permutations have been examined. Once a route has been established, it is maintained by some form of route maintenance procedure until either the destination becomes inaccessible along every path from the source, or until the route is no longer desired.

Typically the Route Discovery involves broadcasting and forwarding Route Request (RREQ) packets until the route is found. All the application packets generated in the mean time are buffered at the source node. There can be a large latency associated with this route discovery if the destination is several hops away. This latency can be very large, particularly if an expanding ring search technique is used as is done in AODV. Transceivers typically used in these networks are memory constrained and hence a big latency can force them to drop packets from the buffer. The large latency can also be unsuitable for some applications especially the ones which use transmission control protocol (TCP).

The other drawback of the discovery process is the number of routing packets it generates/forwards during the process. These networks can span in large areas and such broadcasting and forwarding can tremendously increase the latency as well as the overhead. This overhead is even worse if the destination node does not even exist in the network, and in this case, the source node keeps repeating the discovery process and flooding the network in vain.

Accordingly, a need exists for a system and method to discover routes to a destination in an efficient way and also decrease the latency involved in finding the route.

SUMMARY OF THE INVENTION

An object of the present invention is to provide a system and method for message exchanges to determine optimized communication routes with a minimum of overhead messages and buffered data.

Another object of the present invention is to provide a system and method for controlling a sending node to attempt to locate a route without intelligent access point (IAP) assistance if a detected neighbor node is a destination.

Another object of the present invention is to provide a system and method for controlling a sending node to buffer packets while exchanging messages with an IAP seeking route assistance to prevent using an un-optimal route.

Another object of the present invention is to provide a system and method for controlling a sending node to attempt to locate a route without IAP assistance, and thereafter exchange messages with an IAP seeking route assistance.

Another object of the present invention is to provide a system and method for controlling a sending node to exchange a variety of non-specific messages with an IAP seeking route assistance to prevent using an un-optimal route.

These and other objects are substantially achieved by providing a system and method for controlling the dissemination of Routing packets between nodes during route detection. By reducing exchanged messages to a specific series of exchanges indicating destination, destination node detection, and route, preferably using a series of IAP devices, routes are discovered in an efficient manner and latency in finding routes between nodes is reduced. Reducing such latency thereby reduces buffered information levels at individual devices, at least due to route selection.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The embodiments of the present invention described below improves the system performance of a wireless network by controlling the dissemination of Routing packets and decreasing the latency in finding routes. In doing so, each embodiment serves to eliminate the need to keep large buffers in each Subscriber Device (SD).

As noted above, wireless networks frequently use On-Demand protocols (e.g. AODV (RFC 3561), DSR (Internet Draft), and so forth) as the routing protocol. Typically the Route Discovery involves broadcasting and forwarding of RREQ packets until the route is found. All the application packets generated in the mean time are buffered at the source node and there typically is a large latency associated with this route discovery if the destination is several hops away. The embodiments described below include a system and method to discover the routes to the destination in an efficient way and also decrease the latency involved in finding the route.

As described in related U.S. Provisional Patent Application Ser. No. 60/439,449 entitled "System And Method For Achieving Continuous Connectivity To An Access Point Or Gateway In A Wireless Network Following An On-Demand Routing Protocol", filed Jan. 13, 2003, in U.S. Provisional Patent Application Ser. No. 60/439,455 entitled "System And Method For Modifying AODV To Facilitate Smooth Handoffs And Eliminate Unidirectional Links In A Wireless Network", filed Jan. 13, 2003, and in U.S. patent application Ser. No. 10/755,346, entitled "System And Method For Achieving Continuous Connectivity To An Access Point Or Gateway In A Wireless Network Following An On-Demand Routing Protocol, And To Perform Smooth Handoff of Mobile Terminals Between Fixed Terminals In The Network", filed Jan. 13, 2004, the entire content of each being incorporated herein by reference, nodes typically maintain the route to their associated IAP, and the IAP also maintains the route to all the nodes which are associated with the IAP.

An IAP in such a system is assumed to have connectivity with other IAP devices through a back bone or some other kind of link, such that the IAP can forward the packet for an SD to the IAP with which the SD is associated. An example is shown in FIG. 1.

Figure 1:
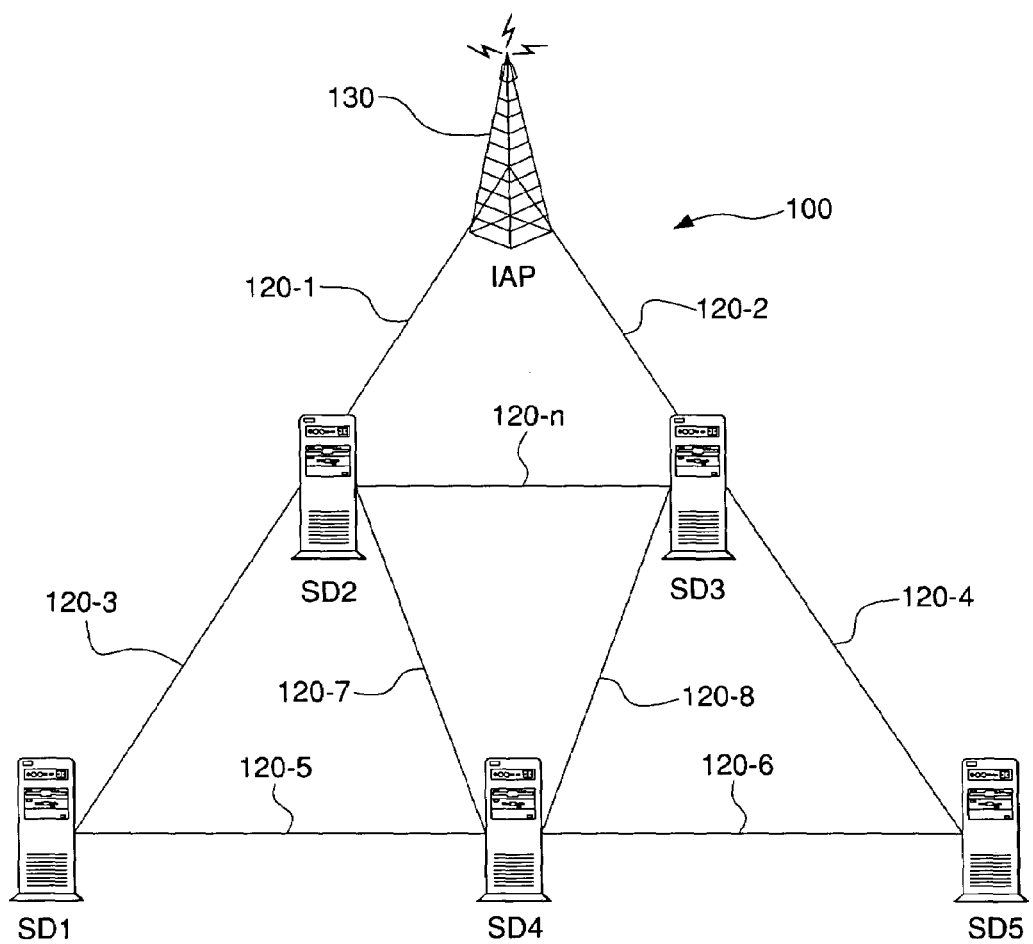
FIG. 1 is a conceptual block diagram illustrating an example of the connections within an ad-hoc network in a first position employing a system and method according to an embodiment of the present invention.
Figure 2:
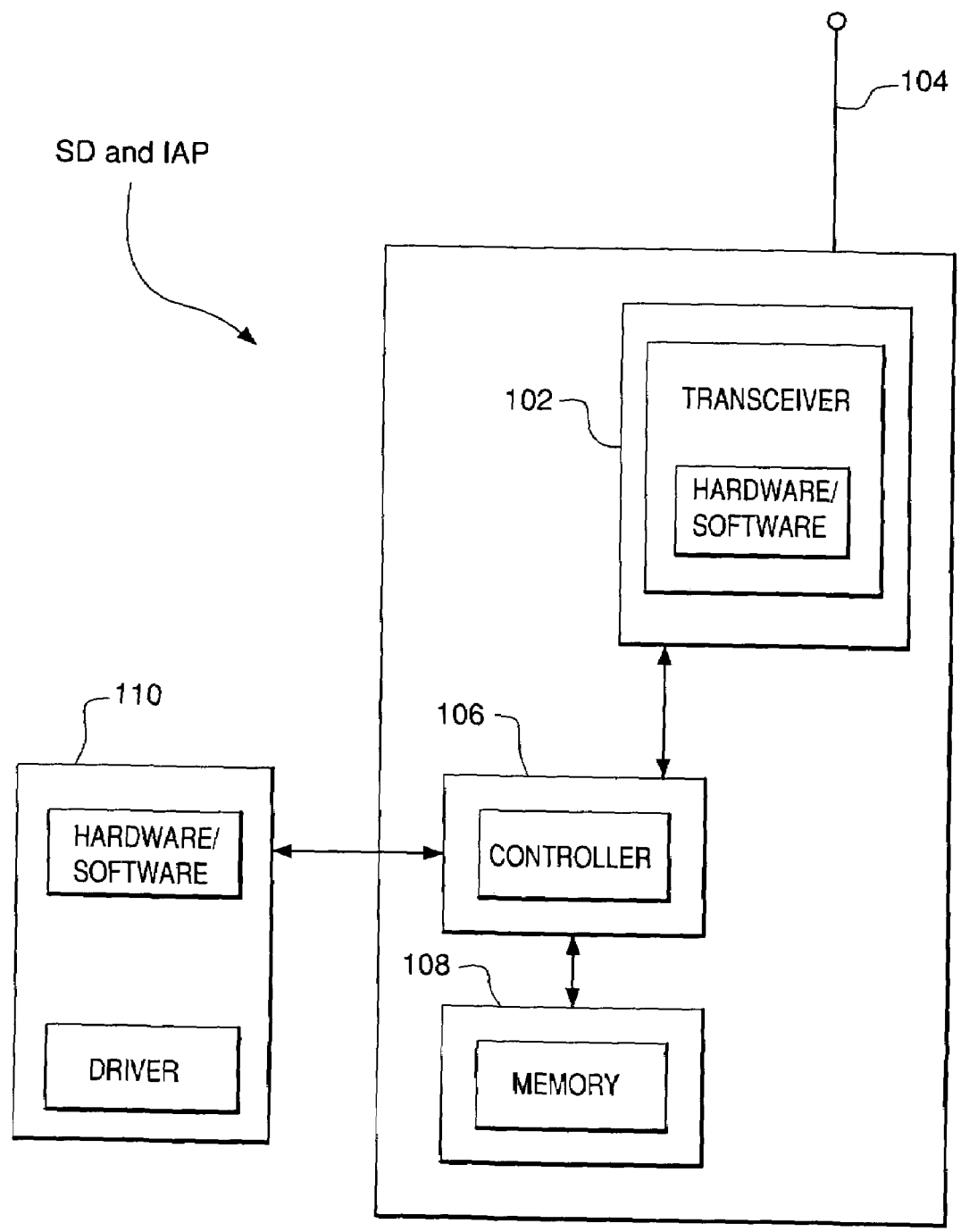
FIG. 2 is a block diagram of an example of a wireless node as shown in FIG. 1.

FIG. 1 is a conceptual block diagram illustrating an example of the connections within an ad-hoc network in a first position employing a system and method according to an embodiment of the present invention. In FIG. 1, a network 100 is shown including Subscriber Devices SD 1 to SD 5 (referred to generally as SD), IAP Devices IAP 130 (referred to generally as IAP) 4, and a series of communication links 120. FIG. 2 is a block diagram of an example of a Subscriber Device SD and IAP, as shown in FIG. 1.

As can be appreciated by one skilled in the art, the SD and IAP are each capable of communicating with each other directly, or via one or more other nodes operating as routers for packets being sent between nodes, as described in U.S. Pat. No. 5,943,322 to Mayor, and in U.S. patent application Ser. Nos. 09/897,790, 09/815,157 and 09/815,164, referenced above. As shown in FIG. 2, each SD and IAP can include a transceiver 102 which is coupled to an antenna 104 and is capable of receiving and transmitting signals, such as packetized signals, to and from the SD and IAP, under the control of a controller 106. The packetized data signals can include, for example, voice, data or multimedia information, and packetized control signals, including node routing and update information.

Each SD and IAP can further include a memory 108, such as a random access memory (RAM), that is capable of storing, among other things, routing information pertaining to itself and other nodes in the network. The SD and IAP can periodically exchange respective routing information, referred to as routing advertisements, with each other via a broadcasting mechanism at various intervals, such as when a new node enters the network, or when existing nodes in the network move.

As further shown in FIG. 2, certain nodes can include a host 10 which may consist of any number of devices, such as a notebook computer terminal, mobile telephone unit, mobile data unit, or any other suitable device. Each SD and IAP can also include the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software protocols to perform automatic repeat request (ARQ) functions and media access control (MAC), including a local dissemination protocol in accordance with the embodiments of the present invention described below.

An IAP can either use an address resolution protocol-reverse address resolution protocol (ARP-RARP) mechanism or routing to find out about the particular IAP with which the destination is associated and hence can forward to it. The other IAP is then responsible to forward it to the destination. For the example below, it is also assumed here that the IAP can know if the node does not even exist in the network. This knowledge of the routes maintained by an IAP is used by the embodiments as described below.

When a data packet is sent from the host to the transceiver, the transceiver determines whether the destination is inside the mesh-network, or outside the mesh-network. If the destination is outside the network (e.g, on the World Wide Web) then the packet should be sent to the IAP. Since the protocol is proactively maintaining the route to the associated IAP, this transmission is achieved without any buffering/latency. If it is determined that the destination is inside the network an effort is made to find the best route to the destination. If the route to the destination is present in the routing table and is valid, the packet is forwarded to the next hop towards the destination. If no route is present, the packet is forwarded to the associated IAP and a special message called Status Request is sent to the IAP that contains the destination address.

Upon receiving this Status Request, the associated IAP consults its routing table to see if the node is present in its routing table. As described before, an IAP should have a route to all the nodes which are associated with it. An IAP can also have some routes to some other nodes which are not associated with it. If a route is present, the associated IAP sends back a special message called Status Reply with a success bit set, otherwise Status Reply is sent with the success bit unset.

Upon receiving the Status Reply with success bit set, the SD initiates an expanding ring search, as described in AODV, for the destination with maximum time to live (TTL) equal to the number of hops to the IAP. In this example, the maximum TTL can also be a function of the number of hops to the IAP or something else. A route can be determined when the RREQ reaches the destination either itself or via an intermediate node with a 'fresh enough' route to the destination. A 'fresh enough' route is a valid route entry for the destination whose associated sequence number is at least as great as that contained in the RREQ. The route is made available by unicasting a Route Reply (RREP) back to the origination of the RREQ. Each node receiving the request caches a route back to the originator of the request, so that the RREP can be unicast from the destination along a path to that originator, or likewise from any intermediate node that is able to satisfy the request.

Upon receiving the RREP the source node updates its routing table and starts using the newly found route. In doing so, the flooding of the Route Request packet is stopped at the IAP level and hence never goes out of control. This significantly reduces the overhead as such networks can span in large areas. This also eliminates the possibility of doing a network-wide Route Discovery, which can lead to heavy overhead, for a destination node which does not even exist in the network.

The source node keeps on sending packets to the IAP while the IAP is waiting for the Status Reply or Status Error message. Thus no packets are buffered in the transceiver of SD. If the Status Reply comes with status bit unset, the node keeps on sending packets to the associated IAP unless the IAP receives a special message called Status Error. The events which can lead to such a message are described below.

The IAP that contains the destination address upon receiving the Status Request message probes the routing table in the transceiver to find if it has a wireless route to the destination. If the probe is unsuccessful, the IAP tries to locate the IAP with which the destination is associated. This can be a route look up in the routing table of the IAP host or an ARP cache look up, or employ some other suitable method. If the IAP determines that it cannot find the IAP with which the destination is associated and hence cannot forward the packet, it generates the Status Error message to the source node.

The possible contents of the messages described above can include, but are not limited to, the following.

Status Request packet
1. Address of the source node
2. Address of the destination node
3. Find Bit (described below)

Status Reply packet
1. Address of the source node
2. Address of the destination node
3. Status bit
4. Found bit (described below)

Status Error packet
1. Address of the IAP sending the error message
2. Address of the source node
3. Address of the destination node The same information can also be conveyed through any other messages which are flowing between the devices. Even if the transceiver cannot determine whether the destination is inside the mesh-network or outside, it should use the Status Request and Status Reply method as described above to find the route.

There can be several variations to the preferred embodiment of the system and method of the present invention. In a network following an "on demand" protocol, it is possible to have a neighbor entry for a neighboring node in the neighbor table but no route entry for it in the routing table. This can be due to several reasons, such as having a non valid sequence number of the neighbor.

Therefore in a first variation, the node knows that the destination node is a neighbor, but it still will have to find a route for it. In such a case, before initiating the Status Request message to the IAP and starting to send packets to the IAP, it is preferable to send an RREQ for the destination. This RREQ can be either broadcast or unicast.

In case of broadcast, the RREQ should not be forwarded by any other node. If a Route Reply is received then there is no need to go through the process described above. If no Route Reply is received, which can happen due to wrong neighboring information, movement or power loss, then the node can either follow the above process or declare the destination as unreachable for the time being and try again later. Therefore, there can be several variations in the approach followed.

In a second variation, in place of sending the Status Request message and data packet to the IAP simultaneously, the source node can also buffer the packets while waiting for the Status Reply or Status Error. This way no packets will be sent over the temporary un-optimal route. The following example explains this in greater detail.

In the network 100 shown in FIG. 1, the lines 120-1 to 120-*n* represent the connectivity among SD and IAP devices, thus SD 1 is neighbor of SD 2 and SD 4. For the example below, SD 1 is the source node and SD 5 is the destination node, however, any number of node configurations can exist within the network 100. For this example, it is assumed that all the SD devices (SD 1 to SD 5) are associated with the IAP 1. For this example, it is also assumed that SD 1 uses SD 2 to reach the IAP while SD 5 uses SD 3 to reach the IAP and the IAP uses the reverse route to reach SD 1 and SD 5. In one communication example in the network 100 of FIG. 1, as soon as the application starts generating the packet for communication from SD 1 to SD 5, the transceiver of SD 1 will start sending the packets to the IAP, and will also issue a Status Request message. The IAP will in turn forward the packet to the SD 5 and reply with Status Reply message with status bit set. This way the packets will travel through an un-optimal route of 4 hops (i.e. SD 1, to SD 2, to IAP, to SD 3, and to SD 5) until the local Route Discovery process is completed by node SD 1, when it is most likely to get the 2 hop route through SD 4 (i.e. SD 1, to SD 4, and to SD 5).

Thus the second variation, by not sending the packets to the IAP while waiting for Status Reply or Status Error, avoids the usage of this temporary un-optimal route (i.e. SD 1, to SD 2, to IAP, to SD 3, and to SD 5). However, the second embodiment will delay the sending of packets which might be undesirable for some applications, and will also need large buffer space in the transceiver of SD 1.

In a third variation, the node can first do a local Route Discovery before sending the packets to the IAP, or sending any Status Request message. In this variation the source node will first do a local Route Discovery process for the destination. For example, the source node can do an expanding ring search with the maximum TTL equal to the number of hops to the IAP. The maximum TTL can also be a function of the number of hops to the IAP or something else. If the node receives a Route Reply message, the node then starts sending the packets to the destination. If no reply is received after one or more attempts, the node can safely determine that the destination node is not in its vicinity, determined by the maximum TTL it has used.

At this point the node typically has to use the IAP to send the packets to the destination. This can be achieved through the following two techniques.

In a first technique, the node can start sending packets to the IAP once the node determines that the local Route Discovery has failed. The node will stop only if a Status Error message is received from the IAP indicating that the destination node does not exist in the network currently.

In a second technique, the node can send a special message to the IAP or the Status Request message with the find bit set to find if the destination node exists in the network. The IAP upon receiving the message can query its host routing table or ARP cache, or employ some other suitable method, to find the IAP with which the destination node is associated with. If the IAP is successful in finding the IAP with which the destination node is associated, and hence the destination node itself, the IAP indicates this by sending a Status Reply message with the found bit set. Otherwise the IAP sends a Status Error message.

If a Status Reply message is received by the source node with the found bit set, then the node starts sending the packets to the IAP for the IAP to forward to the appropriate IAP with which the destination node is associated. If the Status Error message is received, then the node can declare the destination as unreachable for the time being and try again later. Again in the third variation, latency is involved in finding the route, and packets also need to be buffered.

In a fourth variation, in place of using special messages like Status Request, Status Reply, and Status Error, the nodes can use other messages to convey the same information. For example, the node generally needs to send DNS and/or ARP queries to the associated IAP to find out about the IP address, MAC address, and so forth. The associated IAP upon receiving such messages can send a special kind of message to indicate if the destination node is associated with that IAP or not, or if the destination node does not even exist in the network. The ARP on the domain name system (DNS) replies can also be changed to contain this information. This way the Status messages will not be needed. As noted above, there can be several ways to discover such information.

The variations of the present invention described above provide several advantages. There is a low latency associated with finding routes, and no buffering of packets is needed at the transceiver of the SD. Low routing overhead is required, as Route Discovery process is initiated only if it is known that the destination exists in the neighborhood. Also, the present invention increases the scalability of the network.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for determining a route for routing data packets between nodes in a wireless ad-hoc multi-hopping peer-to-peer communication network, the method comprising:

when one of the nodes acts as a source node and attempts to send a data packet to a destination, the source node determines if the destination is another node within the network or outside the network;

if the source node determines that the destination is outside the network, the node transmits the data packet for delivery to an intelligent access point of the network with which the source node is associated;

if the source node determines that the destination is another node in the network, the source node checks a routing table to determine if a route to the destination exists;

if the routing table indicates that a route to the destination exists, the source node transmits the data packet for delivery to the destination via the route;

if no route to the destination is present in the routing table, the source node transmits the data packet for delivery to the intelligent access point with which the source node is associated, and transmits a status request message to that intelligent access point;

upon receipt of the status request message, the intelligent access point determines whether its routing table include a route to the destination and if so, the intelligent access point sends a status reply message having a first condition indicating a found route to the source node, and if not, the intelligent access point sends the status reply message having a second condition to the source node; and upon receiving the status reply message having the first condition, the source node utilizes the found route to the destination and transmits additional data packets addressed to the destination for delivery to the destination via the found route, and upon receiving the status reply message having the second condition, the source node transmits the additional data packets to the intelligent access point for delivery to the destination.

2. A method as claimed in claim 1, wherein:
when the source node is awaiting receipt of the status reply message, the source node transmits the additional data packets to the intelligent access point.

3. A method as claimed in claim 1, wherein:
when the source node is awaiting receipt of the status reply message, the source node refrains from transmitting the additional data packets to the intelligent access point.

4. A method as claimed in claim 1, wherein:
the source node is a mobile node.

* * * * *